United States Patent [19]

Blume et al.

[11] Patent Number: 5,943,001
[45] Date of Patent: Aug. 24, 1999

[54] SWEPT COMB METHOD OF JAMMING

[75] Inventors: Richard J. Blume, Alexandria, Va.; Norman J. Lesko, Oxon Hill, Md.

[73] Assignee: The United States of America as represented by the Secretary of the Navy, Washington, D.C.

[21] Appl. No.: 05/449,571

[22] Filed: Mar. 8, 1974

[51] Int. Cl.⁶ ....................................................... G01S 7/38
[52] U.S. Cl. ................................................. 342/14; 342/15
[58] Field of Search .......................... 343/18 E; 342/13, 342/14, 15, 16, 17, 18, 19

[56] References Cited

U.S. PATENT DOCUMENTS

| | | | |
|---|---|---|---|
| 3,504,366 | 3/1970 | Tolles et al. | 342/15 |
| 3,618,096 | 11/1971 | Schoneborn | 342/14 |
| 3,715,755 | 2/1973 | Golden | 342/15 |

*Primary Examiner*—John B. Sotomayor
*Attorney, Agent, or Firm*—Thomas E. McDonnell; Charles J. Stockstill

[57] ABSTRACT

An improved countermeasure technique for providing jamming signals against lobing radar, especially COSRO (conical scan on receive only) radar. A power spectrum (or comb) is generated having specific spectral line separation over a frequency band of the expected range of scan frequencues. The line spectrum, preferably having a flat topped envelope is then swept as a unit so that all frequencies within a range of expected scan frequencies are traversed at least once by a spectral line. The swept comb is used to modulate a repeater pulse train transmitting to a lobing radar. The sweep of the comb causes at least one spectral line to beat with the scan frequency of the radar resulting in antenna oscillation and sidelobe lockup by deception of the angle-tracking circuits of the radar.

8 Claims, 3 Drawing Sheets

SWEPT COMB METHOD OF JAMMING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in electronic countermeasure techniques and more particularly to new and improved techniques for electronic deception of a lobing radar. In the field of electronic warfare it has been general practice to use a modulated beam of repeater pulses to return a deception signal to the angle-tracking circuits of a lobing radar. The success of such techniques has been dependent on the type of radar used, the power available, and the ability to determine scan frequencies of the radar. Particular problems have been encountered in deceiving missiles equipped with COSRO (conical scan on receive only) radar.

In order to deceive a COSRO radar, a signal near the scan frequency must be used to modulate a repeater pulse train to form an envelope detected by the angle-tracking circuits (elevation and azimuth) of the scanning radar. Since the COSRO radar, as is well known, does not disclose its precise scan frequency, the modulation signal must cover a range of expected scan frequencies of the radar.

One method presently used and known as "swept audio" employs, in a particular embodiment, repetitive linear ramp upsweep from 60–80 Hz. The 60–80 Hz range is used against those COSRO homing missiles which employ an approximately 70 Hz scan frequency. A repetitive downsweep or a repetitive triangular sweep, that is, an upsweep followed by a downsweep, may also be used. By sweeping the modulating frequency through the 60–80 Hz range many times during a period of radar tracking, it was believed that successful jamming could be accomplished. However, an analysis of the "swept audio" technique has shown that power is only concentrated in specific frequencies which only by chance may be near the scan frequency as required.

Accordingly, the present invention has been developed to overcome the specific shortcomings of the above known and similar techniques and to make better use of the RF (radar frequency) power and time available for jamming and deceiving the angle-tracking circuits of the lobing radar.

SUMMARY OF THE INVENTION

The general purpose of this invention is to provide a radar deception or jamming technique that has all the advantages of similarly employed techniques and none of the disadvantages. The invention is designed to provide a more efficient use of RF power and available time to insure a higher degree of successful deception of a lobing radar. To attain this, the present invention provides for the generation of a modulation signal having a frequency spectrum extending over the range of expected scan frequencies of a lobing radar. The spectrum (carrier plus side-bands) is in the form of a series of lines (comb) separated by a fixed frequency defining an envelope over the range of expected scan frequencies. All of the power available for radar deception is concentrated in the lines of such a spectrum. The comb is then swept as a unit over a range equal to the line separation. All frequencies within the range of expected scan frequencies (the envelope) are therefore traversed at least once by a line of the spectrum in the time available. When a line of the comb passes through the bandwidth of the azimuth and elevation angle-tracking circuits, it beats with the scan frequency and causes the antenna beam to oscillate at the difference frequency. By providing sufficient power and sufficient time within the noted bandwidth, the antenna will oscillate to a position where sidelobe lockup of the radar will occur. This technique allows the successful deception of the lobing radar as to the angle of elevation or azimuth of, for example, a missile relative to a target.

OBJECTS OF THE INVENTION

It is an object of the present invention to provide an electronic deception technique for use against lobing radar.

Another object of the invention is to provide a deception technique wherein the scan frequency of the lobing radar is not precisely known.

A further object of the invention is to provide for relatively even power distribution in the deceiving frequency range, including, for example, an expected scanning range of 60–80 Hz Still another object of the invention is to provide a technique for increased success in deceiving the angle-tracking circuits of a COSRO radar.

A still further object is to cause antenna oscillation of the lobing radar such that sidelobe lockup will occur.

Other objects, advantages and novel features of this invention will become apparent from the following detailed description of the invention when considered in conjunction with the accompanying drawings wherein:

DETAILED DESCRIPTION

Figure 1:
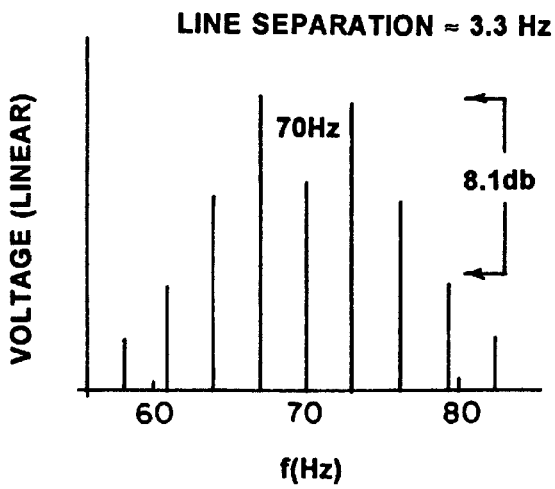
FIG. 1 is a schematic diagram of the frequency spectrum of a linear upsweep (or downsweep)between 60 and 80 Hz, repeated 3.3 times per second. This swept audio schedule is presently used for deception of COSRO radars.

In describing this invention, reference will be particularly made to a COSRO radar used in a homing missile and having an expected scan frequency near 70 Hz giving rise to a range of expected scan frequencies of 60–80 Hz. Additionally, it is to be understood that reference to jamming is meant to be synonymous with deceiving and vice versa.

Radar beams characteristically are composed of a main lobe and a series of sidelobes at various angles in relation to the main beam. Most of the radiated power is in the main lobe and in the absence of jamming, most of the received signals originate in the main lobe. Consequently, nearly all radars are designed to process information received from all lobes as if it came from the main lobe. It has been found that if a deceiving signal causes the antenna of a tracking radar to oscillate so that a sidelobe is directed toward a sufficiently strong target(and with the radar's range gate set on the target), while simultaneously the main beam looks at nothing, the radar will continue to track using the sidelobe information as though it came from the main lobe. This condition is known as sidelobe lockup. It leads to an angular error in tracking equal to the angle between the main lobe and the sidelobe, which typically may be anywhere from 10 to 20 degrees. Such an angular error, if sustained, constitutes successful jamming of a homing missile.

In a lobing radar system, and in particular a COSRO radar system, successful jamming can be accomplished by modulating a repeater pulse train with a signal which beats with the scan frequency of the radar. The beat is exhibited as an oscillation of the antenna and will occur when the modulating frequency falls within the bandwidth of the antenna servo. The phase-sensitive demodulator circuits of the antenna servo use the difference in frequency between the jamming signal and scan frequency, within the bandwidth, to oscillate the antenna. For example, a 69.8 Hz or 70.2 Hz modulating signal will cause a 0.2 Hz oscillation in the antenna servo having a scan frequency of 70 Hz.

Oscillation of the antenna, unless it is extremely slow, is averaged in the autopilot system of a homing missile and produces little error in the homing of the missile. It is therefore required that the highest frequency of antenna oscillation capable of causing sidelobe lockup not be exceeded. This rate of oscillation is determined primarily by the slew-rate characteristics of the servo system used. For purposes of this invention an example will be used employing an antenna having sidelobe at angles ±15°. Additionally, reference will be made only to the azimuth channel of the antenna servo although not limited thereto. In one particular example it has been determined that sidelobes occur at approximately ±15° and maximum slew-rate of the antenna is 22.5° per second. A simple computation shows that the maximum frequency at which the antenna can oscillate between ±15° is 0.375 Hz. The 0.375 Hz in this example is the maximum oscillation frequency that will cause sidelobe lockup. A bandwidth of 0.375 Hz on either side of the scan frequency leads to total bandwidth of 0.75 Hz for this particular antenna servo.

It is known by a spectral analysis of various repetitive wave-forms that power is concentrated in the carrier and side-bands (spectral lines) usually disposed in pairs above and below the carrier frequency. In application to the present invention and the specific example, it is therefore necessary to modulate the repeater pulse train with a signal having a spectral line falling within the 0.75 Hz bandwidth of the antenna servo in order for sidelobe lockup to occur. This signal must also be provided during the time the radar is tracking. For purposes of illustration, a missile traveling at 600 knots whose COSRO radar locks on target at 4.5 miles, will hit the target in 27 seconds. This provides an approximate 20 seconds in which to successfully jam the radar.

FIG. 1 schematically shows a frequency spectrum of the modulating signal of the known technique of swept audio. The modulating signal was a repetitive linear sweep over a frequency range of 60–80 Hz (the expected scan frequency range of COSRO radar) at a rate of 0.3 seconds per sweep 3.3 Hz). While it might have been expected that a spectrum having power in all frequencies would have resulted from the repetitive ramp sweep, FIG. 1 shows that power is actually concentrated only in specific frequencies centered about 70 Hz with unequal power distribution between sidelobe pairs (8.1 db difference between min and max.). It should be particularly noted that the linear sweep actually gives rise to a stationary spectrum having lines separated by 3.3 Hz. The effect of a signal of the type shown in FIG. 1. in jamming can be seen in FIG. 2.

Figure 2:
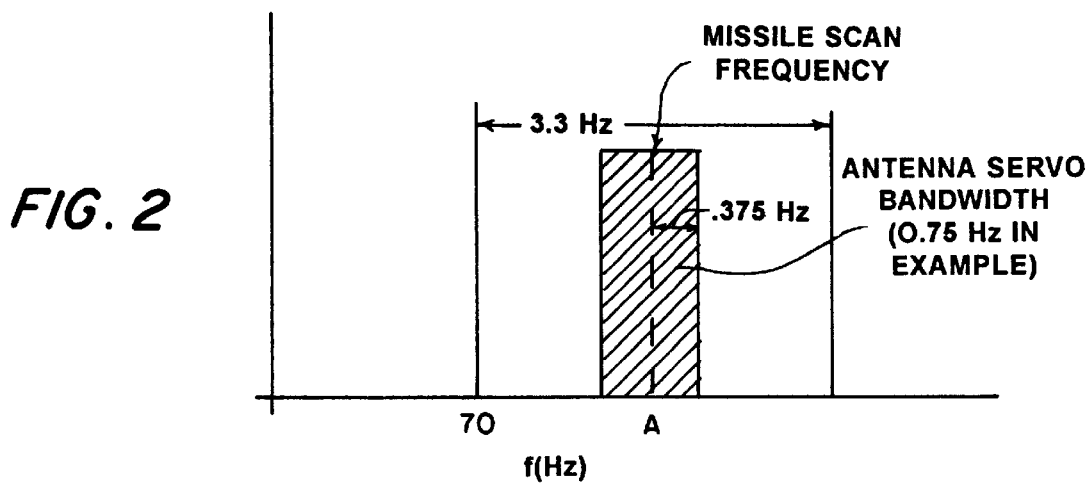
FIG. 2 is an extended schematic showing two adjacent lines of the spectrum of FIG. 1. and additionally showing the scan frequency and antenna servo bandwidth.

FIG. 2 is an expanded schematic showing of the FIG. 1 signal with a scan frequency A and antenna servo bandwidth (shaded area) superimposed. As was noted previously, a spectral line falling within the antenna servo bandwidth is required to cause oscillation to sidelobe lockup. FIG. 2 shows that with a stationary comb it is possible for the scan frequency and bandpass to fall between spectral lines (comb). At this point oscillation will not occur and the missile homing will remain on track. In actual practice the probability of the swept audio technique providing a spectral line within the bandpass is approximately 1 in 4 (bandwidth÷line separation=0.75/3.3).

Figure 3:
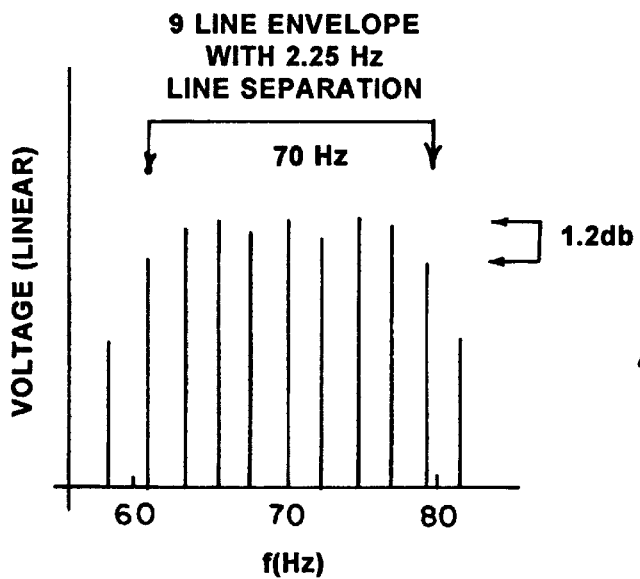
FIG. 3 is a schematic showing the frequency spectrum (comb) used in the practice of the present invention.

FIG. 3 shows a preferred embodiment of a spectral comb for practicing the present invention. The comb is composed of primarily 9 lines separated by 2.25 Hz and distributed over the expected scan frequency range of the lobing radar (in this case 60–80 Hz). The spectral lines of the comb form an envelope having a flat top due to the substantially equal distribution of energy (1.2 db difference between min. and max.). As can be seen immediately, a more efficient distribution of energy has already been accomplished over the prior waveform of FIG. 1.

The present invention is designed to overcome the problems of chance allowed by the stationary comb of FIG. 1 by insuring that a spectral line falls within the bandpass of the antenna servo. This must be accomplished in the time period of radar tracking (20 sec. in this example). This is accomplished by sweeping the comb as a unit so that all frequencies of the range of expected scan frequencies are traversed at least once by a spectral line. Known techniques of sweeping the carrier will automatically sweep the sidebands which follow the carrier.

Figure 4:
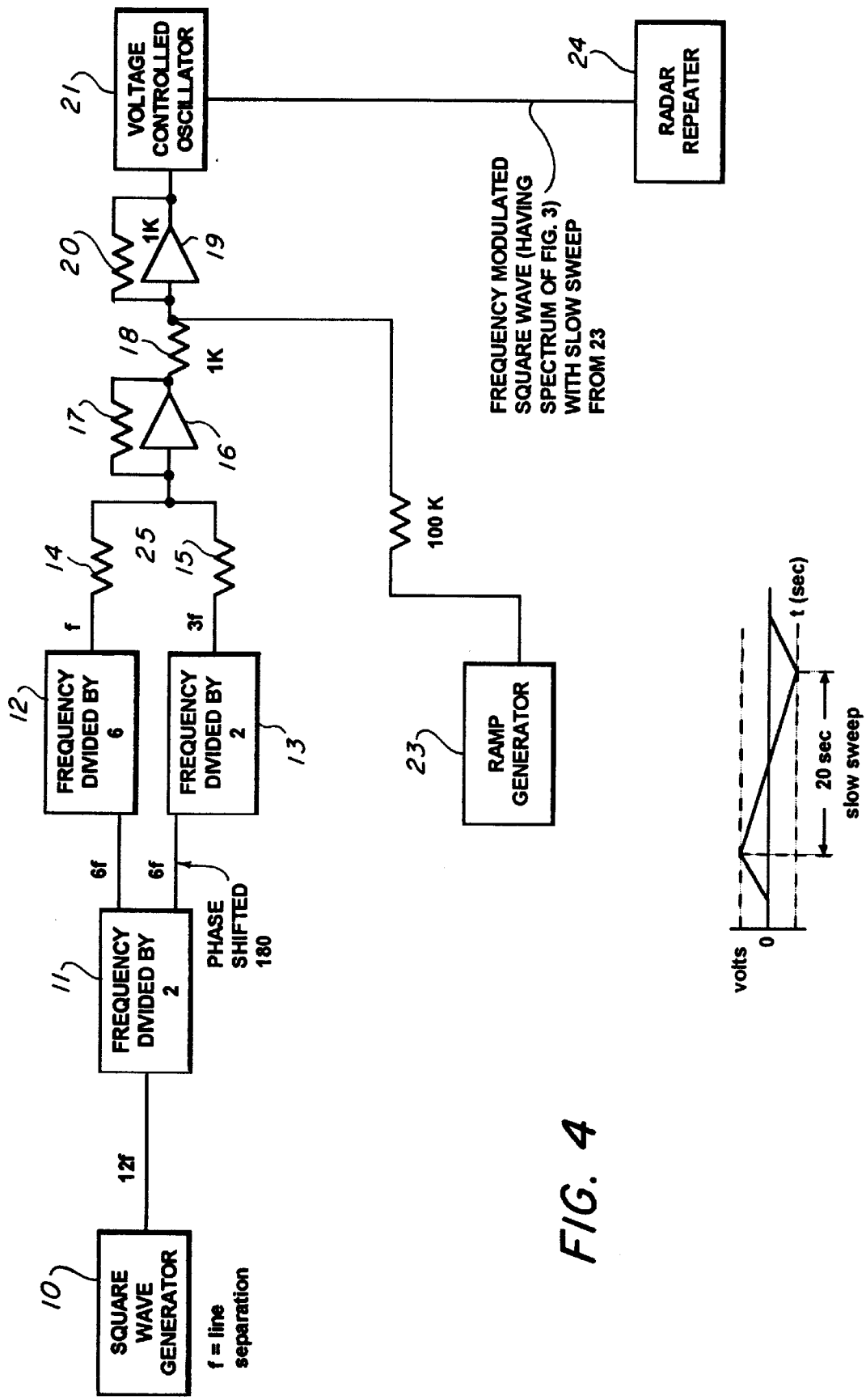
FIG. 4 is a schematic diagram of the apparatus used to generate and sweep the comb of FIG. 3.
Figure 5:
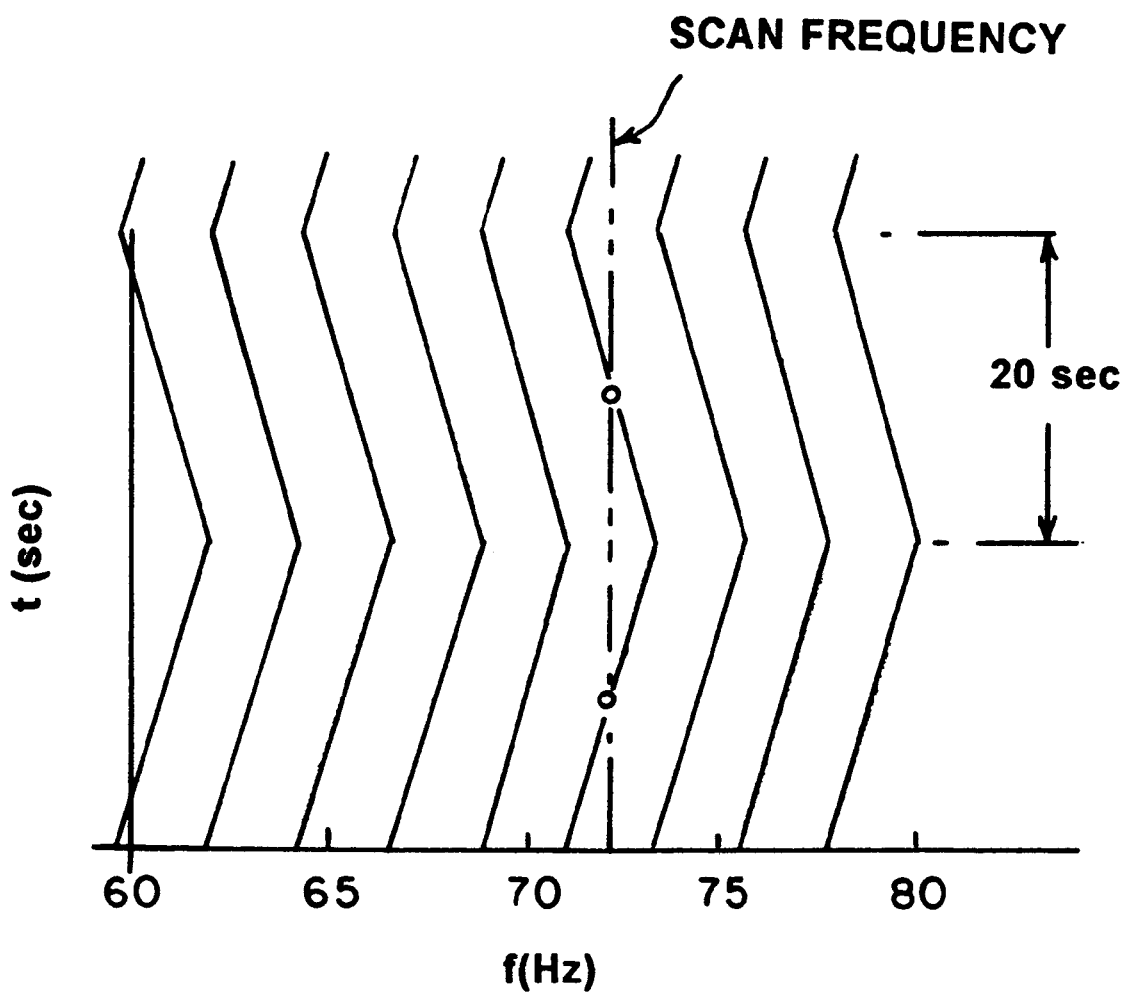
FIG. 5 is a schematic showing the frequency versus time relation as the comb of FIG. 3 is swept over the desired frequency range.

FIG. 4 shows a schematic diagram of a preferred embodiment for practicing the invention. It has been found that by combining square wave signals of f and 3f and using the combination to frequency modulate a voltage-controlled oscillator (VCO) having a 70 Hz nominal center frequency, the spectrum of FIG. 3 can be created. Element 10 provides a square-wave signal of 12f which is divided by elements 11, 12 and 13 to give f and 3f signals, where f represents the separation between spectral lines. While element 10 has been shown as a square wave source it can be any other source delivering a frequency of 12f. The signal from divider 11 is phase shifted 180° prior to being divided by element 13. The signals f and 3f are then combined through resistors 14 and 15 at junction 25 and transmitted through operational amplifier 16, and resistor 18 to junction 26. If at this point no other signal is combined at 26, the signal fed through operational amplifier 19 will frequency modulate a voltage-controlled oscillator 21 to produce a signal having the spectrum of FIG. 3. The signal is produced by fixing the magnitudes of the f and 3f signals at such relative values so that their combination at 25 produces four discrete voltage levels such that if each of the voltage levels were applied separately as a DC voltage to the voltage-controlled oscillator 21, the levels would produce frequencies of approximately 80.22, 75.23, 64.83 and 59.87 Hz respectively as outputs from the VCO. The present invention then uses a ramp type or triangular sweep generated by generator 23 and having a voltage designed to cause a linear 2.25 Hz shift every 20 seconds. This signal is combined at 26 to sweep the frequency spectrum as shown in FIG. 5 and produce the deceiving modulating signal at the VCO output. The modulating signal is then fed to repeater 24(an electronic countermearure (ECM) radar repeater)to provide the repeater pulse train with the proper modulation envelope. In practical embodiments, the modulating signal sent to repeater 24 is a square wave which turns the repeater on or off. Resistors 14,15,17,18,20 and 22 can be those values as indicated or any values normally used to maintain circuit operation as is known in the art.

FIG. 5 shows a time versus frequency graph for the comb of FIG. 3 swept over a distance of 2.25 Hz in 20 seconds (the time period of tracking) by the apparatus of FIG. 4. As can be seen all frequencies within the comb are swept at least once by a spectral line. The circles in FIG. 5 represent equality of the scan frequency of the tracking radar and one of the spectral lines. Although FIG. 5 shows equality occurring halfway through one sweep, in general equality occurs anywhere within one sweep. It is now seen that since a spectral line will be insured of passing through the bandpass of the antenna servo, successful oscillation and sidelobe lockup can occur. In actual practice, the time spent in jamming by a spectral line is 6.8 seconds and represents sufficient time to cause sidelobe lockup in the present example (2.25 Hz/20 sec=0.11 Hz sec$^{-1}$ and 0.75 Hz/0.11 Hz sec$^{-1}$=6.8 sec). Although FIG. 5 shows alternating upsweeps and downsweeps (i.e., a triangular sweep) of the comb, either all ,upsweeps or all downsweeps may be used.

An experimental simulator was used to test the present technique of swept comb jamming on a COSRO radar having a scan frequency within the range of 60–80 Hz. Using the spectrum of FIG. 3, the comb was swept through 2.25 Hz in an extended time period of 71 sec by the apparatus of FIG. 4. From an analysis of strip chart recordings of the azimuth oscillation of the antenna, it was found that sidelobe lockup occurred for an equivalent target cross section of $10^5 m^2$. While the time of sweep for tactical situations for the particular example given will more realistically require a sweep of 20 seconds, the 71 second sweep was used as a means of more easily observing the physical response.

From the above description it can thus be seen that the present invention has indeed resulted in an improved technique for jamming or deceiving a lobing radar system. Contrary to prior known techniques, the present invention does not rely on the chance occurrence that a deceiving signal will fall within the bandpass of the antenna servo. The present invention constructs a modulating waveform having a frequency spectrum exhibiting an envelope which extends over a range of expected frequencies. The spectrum is so constructed as to make best use of the power available by forming a substantially equal distribution of the power in the lines of the spectrum extending over the range of expected scan frequencies. In order to overcome the high chance of jamming failure present from stationary comb use, the above comb is then swept as a unit in the time available over a range such that all frequencies within the range of expected scan frequencies are traversed at least once by a line of the comb. A spectral line will therefore be insured of falling within the bandpass of the antenna servo in order to drive the antenna to sidelobe lockup. Successful deception is thereby accomplished while making more efficient use of available time and power.

While the present invention has been described with particular reference to the spectral comb of FIG. 3, the particular scan frequency of 60–80 Hz, and the particular comb sweep rate of 20 seconds, it can be readily seen that various modifications can be made to accomodate differences in the above parameters. It might be specifically noted that any spectral distribution (including that of FIG. 1) can be swept to cause angle deception by sidelobe lockup provided sufficient power and time are available to insure that the spectral line will fall within the antenna servo bandpass and provided that the line separation of the comb is such as to insure that the sweep rate during the time available allows a spectral line to remain within the bandpass of the antenna servo for sufficient time as to cause sidelobe lockup.

Obviously many modifications and variations of the present invention are possible in light of the above teachings. It is therefore to be understood that within the scope of the appended claims the invention may be practiced other wise than as specifically described.

What is claimed and desired to be secured by Letters Patent of the United States is:

1. A method of deceiving the angle tracking circuits of a lobing radar comprising:

receiving a radar beam from a lobing radar;

generating a signal having a frequency spectrum forming a comb defined by a series of spectral lines having an envelope over a given frequency range;

sweeping the comb as a unit over a range of expected scan frequencies of the radar such that all frequencies within said range of expected scan frequencies are traversed at least once by a spectral line;

modulating the received beam with the swept comb signal, and;

retransmitting the modulated beam to the radar.

2. The method of claim 1 wherein the step of generating comprises, generating said signal having a frequency spectrum to form a comb defined by a series of spectral lines having an envelope extending over the range of expected scan frequencies.

3. The method of claim 1 wherein the step of generating comprises, generating said signal having a frequency spectrum to form a comb defined by a series of substantially equal power spectral lines defining a substantially flat-topped envelope.

4. The method of claim 1 wherein said step of receiving comprises, receiving said radar beam from a conical scan on receive only radar, and wherein said step of generating comprises, generating said signal having a frequency spectrum to form a comb defined by a series of spectral lines of substantially equal power centered about 70 Hz and having a 2.25 Hz line separation extending over a range of 60–80 Hz.

5. The method of claim 1 which further includes, generating said signal with sufficient power in the spectral lines and sweeping said comb in time such as to cause the angle tracking circuits of the radar to drive the radar antenna to sidelobe lockup.

6. An apparatus for deceiving the angle tracking circuits of a lobing radar comprising:

means for receiving a radar beam from a lobing radar;

means for generating a signal having a frequency spectrum forming a comb defined by a series of spectral lines having an envelope over a given frequency range;

means for sweeping the comb as a unit over a range of expected scan frequencies of the radar such that all frequencies within said range of expected scan frequencies are traversed at least once by a spectral line;

means for modulating the received beam with the swept comb signal, and;

means for retransmitting the modulated beam to the radar.

7. The apparatus of claim 6 wherein the means for receiving and the means for transmitting are a radar repeater and wherein the means for modulating modulates the repeater pulse train to drive the antenna of the radar to sidelobe lockup.

8. The apparatus of claim 6 wherein the means for generating includes, means for forming said comb as a series of substantially equal power spectral lines defining a substantially flat-topped envelope extending over the range of expected scan frequencies.

* * * * *